United States Patent
Shatil et al.

(10) Patent No.: US 10,511,982 B2
(45) Date of Patent: Dec. 17, 2019

(54) ARRANGEMENT FOR, AND METHOD OF, ANALYZING WIRELESS LOCAL AREA NETWORK (WLAN) FIELD COVERAGE IN A VENUE

(71) Applicant: SYMBOL TECHNOLOGIES, LLC, Lincolnshire, IL (US)

(72) Inventors: Ohad Shatil, Dunwoody, GA (US); Robert T. Franzo, Traverse City, MI (US); Giovanni P. Ritieni, Stony Brook, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 57 days.

(21) Appl. No.: 15/293,026

(22) Filed: Oct. 13, 2016

(65) Prior Publication Data

US 2017/0272964 A1     Sep. 21, 2017

Related U.S. Application Data

(60) Provisional application No. 62/309,659, filed on Mar. 17, 2016.

(51) Int. Cl.
*H04W 24/08* (2009.01)
*H04W 84/12* (2009.01)

(52) U.S. Cl.
CPC ............ *H04W 24/08* (2013.01); *H04W 84/12* (2013.01)

(58) Field of Classification Search
CPC .................................................... H04W 24/08
See application file for complete search history.

(56) References Cited

U.S. PATENT DOCUMENTS

| | | |
|---|---|---|
| 6,973,622 B1 | 12/2005 | Rappaport et al. |
| 7,408,137 B2 | 8/2008 | Sawachi |
| 6,973,622 C1 | 2/2010 | Rappaport et al. |
| 8,184,154 B2 | 5/2012 | Estevez et al. |
| 8,503,336 B2 | 8/2013 | Rappaport et al. |
| 8,972,820 B2 | 3/2015 | Hassan et al. |

(Continued)

FOREIGN PATENT DOCUMENTS

| | | |
|---|---|---|
| CA | 2877763 A1 | 3/2014 |
| KR | 20140012573 A | 2/2014 |

(Continued)

OTHER PUBLICATIONS

"Indoor Path Loss" DIGI XST-AN005a-Indoor Jun. 2012 (Year: 2012).*

(Continued)

*Primary Examiner* — Kevin M Cunningham

(57) ABSTRACT

Wireless local area network (WLAN) field coverage is analyzed in a venue. A mobile data capture device measures coverage data indicative of the WLAN field coverage from a plurality of locations in the venue, and also captures image data indicative of images of the locations in the venue. A controller correlates the measured coverage data and the captured image data at each location. An interface displays the captured image data correlated with the measured coverage data at each location. Impact score value data indicative of the WLAN field coverage may also be determined, correlated, and displayed for each location.

12 Claims, 9 Drawing Sheets

(56) References Cited

U.S. PATENT DOCUMENTS

| | | | | |
|---|---|---|---|---|
| 2003/0218570 A1* | 11/2003 | Moore | ............... | G01S 5/02 |
| | | | | 342/465 |
| 2013/0116968 A1 | 5/2013 | Wirola et al. | | |
| 2014/0180572 A1 | 6/2014 | Acker, Jr. et al. | | |
| 2015/0230109 A1* | 8/2015 | Socaciu | ............... | H04W 64/00 |
| | | | | 455/418 |
| 2015/0312774 A1* | 10/2015 | Lau | ............... | H04W 16/20 |
| | | | | 455/446 |
| 2015/0350921 A1 | 12/2015 | Pulleti et al. | | |
| 2017/0127292 A1* | 5/2017 | Jones | ............... | H04B 17/318 |
| 2017/0364090 A1* | 12/2017 | Grufman | ............... | G05D 1/0274 |

FOREIGN PATENT DOCUMENTS

| | | |
|---|---|---|
| WO | 2002027564 A1 | 4/2002 |
| WO | 2016/109428 A1 | 7/2016 |

OTHER PUBLICATIONS

Aruba Network "Aruba Utilities" http://play.google.com/store/apps/details?id=com.arubanetworks.arubautilities&hl=en (retrieved on Oct. 13, 2016).

Zebra Technologies Corporation "LANPlanner—Network Planning Software" https://www.zebra.com/us/en/products/software/wlan-systems/network-design-software/lanplanner.html (retrieved on Oct. 13, 2016).

"Wifi Analyzer" https://play.google.com/store/apps/details?id=com.farproc.wifi.analyzer&hl=en (retrieved on Oct. 13, 2016).

Search Report for GB Patent Application No. 1704189.8 dated Jul. 28, 2017.

\* cited by examiner

TABLE OF OBSTRUCTIONS AND PATTERNS INDEXES (OPI)

| INDEX | OBJECTS/PATTERNS | MATERIAL TYPE + STATE | OPI COEFFICIENT [OPIC] | OPIC RELATION TO DISTANCE [OPIC-D] |
|---|---|---|---|---|
| 1 | WALL | BRICK | 3 | $1/d$ |
| 2 | WALL/DOORS | GLASS | 2 | $1/d$ |
| 3 | WALL/DOORS | DRYWALL/WOOD | 1 | $1/d$ |
| 4 | WALL | CONCRETE | 4 | $1/d$ |
| 5 | SHELVES | METAL + EMPTY | 5 | $1/d$ |
| 6 | SHELVES | METAL + STOCKED | 7 | $1/d$ |
| 7 | MICROWAVE OVEN | INFERRED RF EMISSION | 8 | $1/d^3$ |
| 8 | ELECTRICAL CLOSET | INFERRED RF EMISSION | 5 | $1/d^2$ |
| 9 | CLUSTER OF BARCODE SCANNERS | INFERRED RF EMISSION | 4 | $1/d^4$ |
| 10 | MULTIPLE/CLUSTERED PEOPLE HOLDING DEVICES (LAPTOPS, SCANNERS, PHONE, ETC) | INFERRED RF EMISSION | 5 | $1/d^3$ |
| 11 | RADIATION HAZARD STICKERS/DECALS | INFERRED RF EMISSION | 7 | $1/d^2$ |
| ..... | | | | |
| N | | | | |

FIG. 5

TABLE OF ENVIRONMENTAL CONDITIONS INDEXES (ECI)

| INDEX | OBJECTS/PATTERNS | BASE STATION DETECTED? YES/NO | ECI PENALIZE FACTOR [ ECI-PF ] |
|---|---|---|---|
| 1 | NORMAL OPEN SPACE (NOTHING SPECIAL) | YES | X 1 |
| 2 | INSIDE SMALL ROOM/HALLWAY | YES | X 1 |
| 3 | INSIDE SMALL ROOM/HALLWAY | NO | X 2 |
| 4 | ELEVATOR | NO | X 6 |
| 5 | STAIRWAYS PIER | YES | X 3 |
| 6 | STAIRWAYS PIER | NO | X 4 |
| 7 | MEDICAL/SURGERY ROOM | YES | X 2 |
| 8 | MEDICAL/SURGERY ROOM | NO | X 3 |
| 9 | ELECTRICAL BACKROOM/NETWORK EQUIPMENT DECKS | YES | X 4 |
| 10 | ELECTRICAL BACKROOM/NETWORK EQUIPMENT DECKS | NO | X 5 |
| 11 | | | |
| ⋮ | | | |
| N | | | |

FIG. 6

ARRANGEMENT FOR, AND METHOD OF, ANALYZING WIRELESS LOCAL AREA NETWORK (WLAN) FIELD COVERAGE IN A VENUE

CROSS-REFERENCE TO RELATED APPLICATION

The present application is related to, and claims the benefit under 35 U.S.C. § 119(e) of, U.S. Provisional Patent Application No. 62/309,659, filed Mar. 17, 2016, and entitled "Capturing, Visualization, and Analysis of WLAN field coverage", said provisional application being commonly owned with the instant application by Symbol Technologies, LLC, and the entire contents of said provisional application being incorporated in the instant application by this reference thereto.

BACKGROUND OF THE INVENTION

The present disclosure generally relates to an arrangement for, and a method of, analyzing wireless local area network (WLAN) field coverage in a venue, either indoors or outdoors.

For product locationing, product tracking, product identification, and inventory control of products in a retail, factory, or warehouse environment, or a like indoor or outdoor venue, it is known to wirelessly link one or more mobile data capture devices in a wireless local area network (WLAN) having a plurality of base stations (e.g., access points) deployed in the venue under the control of a network computer or host server. For example, one type of mobile data capture device may be a radio frequency (RF) identification (RFID) tag reader for reading RFID tags, and/or a near field communication (NFC) tag reader for reading NFC tags, the tags being associated with the products in the venue, and another type of mobile data capture device may be either a laser-based or an imager-based bar code symbol reader for reading bar code symbols associated with the products in the venue. The base stations propagate a WLAN field in the venue by transmitting and receiving RF signals to and from such mobile devices to enable the users of the mobile devices to move freely within the venue and still be connected to the WLAN, and, if desired, to the wider Internet. Many modern WLANs are advantageously based on the Institute of Electrical and Electronics Engineers (IEEE) 802.11 standards, marketed under the Wireless Fidelity (Wi-Fi) brand name.

It is often important to analyze or map the coverage of the WLAN field of the RF signals propagated by the base stations in the venue, both prior to establishing the WLAN during network planning, and after establishing the WLAN during monitoring/debugging. Strong RF signal coverage is typically found in certain so-called "hot" zones in the venue, typically in the immediate vicinity of each base station. However, some RF signals may be reflected and/or scattered along multiple, folded paths, and/or at least partially absorbed, by walls, ceilings, floors, shelving structures, and like permanent fixtures and obstructions. In addition, some RF signals may, from time to time, be unpredictably and temporarily attenuated by people walking through the venue, or by forklifts driving through the venue, or by doors being closed, or by some transitory movement of another object or person. Such multi-path propagation and transitory environmental conditions may cause weak, poor, or even no WLAN field coverage in certain so-called "cold" zones in the venue and may compromise network communications and data capture performance. Additional base stations or other network hardware, or additional software, may need to be deployed and configured to provide more uniform and adequate WLAN field coverage in the venue, especially in the cold zones, thereby burdening customer support personnel and resources.

It is known to perform a site survey to analyze the WLAN field coverage in a venue by sampling the RF signals propagated by the base stations. Although generally satisfactory for its intended purpose, the survey or mapped data produced by such sampling is only valid for the time, and only for the specific physical obstructions and/or environmental conditions, during which the survey was conducted. A network analyst reviewing the survey data will not know, for example, whether a particular cold zone was caused by poor deployment of the base stations, or by the presence of some permanent fixture or obstruction, or by some temporary environmental condition such as the transitory movement of some object or person, among other factors. Once the survey is completed, the analyst may not readily be able to resurrect the physical obstructions and/or environmental conditions during which the survey was conducted. This may lead to an incorrect WLAN field coverage analysis. For example, a particular temporary obstruction and/or environmental condition may not recur, and a zone deemed cold at one time may actually be hot at another time.

Accordingly, it would be desirable to render the WLAN field coverage analysis more accurate for network planning/monitoring/debugging purposes, to reduce the burden on customer support personnel and resources, and to readily enable an analyst to resurrect the physical obstructions and/or environmental conditions in which a site survey was conducted.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 5 is a table of representative physical obstructions and patterns indexes for use in determining the impact score value data for display on the display screen of FIGS. 4A and 4B.

FIG. 6 is a table of representative environmental conditions indexes also used in determining the impact score value data for display on the display screen of FIGS. 4A and 4B.

Figure 1:
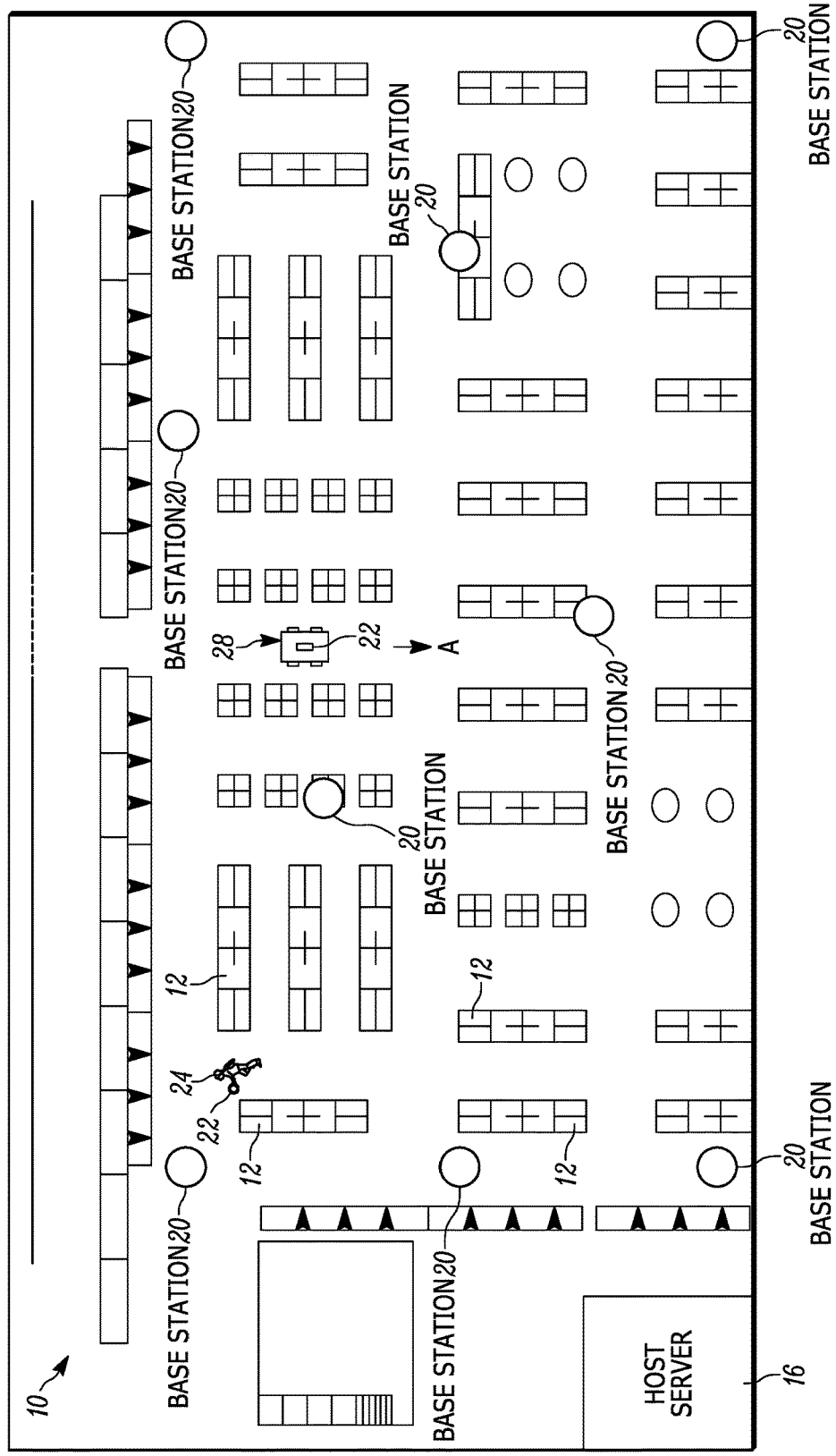
FIG. 1 is a top plan view of a warehouse environment or venue having products associated with data to be captured by mobile data capture devices that are linked in a WLAN having multiple base stations for propagating a WLAN field in an arrangement for analyzing the coverage of the WLAN field in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of this disclosure relates to an arrangement for analyzing coverage of a wireless local area network (WLAN) field in a venue. The arrangement includes a mobile data capture device movable in the venue, for example, by a walking human operator, or by an automated vehicle, such as a land or aerial vehicle. Advantageously, a plurality of base stations, e.g., access points, propagates the WLAN field in the venue by transmitting and receiving radio frequency (RF) signals to and from the mobile data capture device. The mobile data capture device measures coverage data indicative of the WLAN field coverage from a plurality of locations in the venue, and captures image data indicative of images of the locations in the venue. A controller, for example, a programmed microprocessor, is operatively connected to the mobile data capture device, and correlates the measured coverage data and the captured image data at each location. Advantageously, impact score value data, which is indicative of physical obstructions and/or environmental conditions in the venue, may also be determined and correlated with the measured coverage data and the captured image data at each location. An interface is operatively connected to the controller, and displays the captured image data correlated with the measured coverage data at each location. The correlated impact score value data may also be displayed on the interface.

In a preferred embodiment, the mobile data capture device may have an RF receiver for receiving the propagated RF signals indicative of the WLAN field coverage, and the controller measures the coverage data by sampling strengths of the received RF signals. The RF receiver is also operative for receiving a plurality of the propagated RF signals transmitted from RF transmitters at fixed, known positions in the venue, in which case the controller locates the mobile data capture device at each location by measuring strengths of the plurality of the received RF signals, e.g., by triangulation, trilateration, or like techniques. Advantageously, the mobile data capture device has a camera, or like imager, for capturing the image data over an imaging field of view, and a movable mount is preferably provided for moving the camera and the imaging field of view. Advantageously, the mount enables the camera to be rotated and/or tilted to desired extents.

The interface preferably includes a display screen, and the controller controls the display screen to simultaneously display the captured image data and the measured coverage data, and, optionally, the impact score value data, that are correlated at each location that is selected by an analyst who is analyzing the WLAN field coverage. The simultaneous display of the captured image data and the measured coverage data, as well as the optional impact score value data, is advantageously performed in real time as the mobile data capture device moves through the venue. Alternatively or in addition, the simultaneous display of the captured image data and the measured coverage data, as well as the optional impact score value data, at respective locations may be performed after the corresponding measurements have been taken and recorded by the mobile data capture device. As those of skill in the art will realize, the foregoing simultaneous display may take place on the mobile data capture device itself and/or on another computing device based on either real-time or recorded data.

A further aspect of this disclosure is directed to a method of analyzing wireless local area network (WLAN) field coverage in a venue. The method is performed by moving a mobile data capture device in the venue, by measuring coverage data indicative of the WLAN field coverage from a plurality of locations in the venue, by capturing image data indicative of images of the locations in the venue, by correlating the measured coverage data and the captured image data at each location, and by displaying the captured image data correlated with the measured coverage data at each location. The aforementioned impact score value data may also be determined, correlated, and displayed for each location.

In accordance with this disclosure, the display of the captured image data correlated with the measured coverage data at each location, and, optionally, the correlated impact score value data, enables an analyst or user to resurrect the physical obstructions and/or environmental conditions under which the WLAN field coverage analysis was conducted. Thus, the analyst can view the captured image data and determine, among other things, whether a particular cold zone was caused by a poor placement of the base stations, or by a permanent fixture or obstruction, or by some transitory movement by a person or object, or by some environmental condition, or by some other factor. The WLAN field coverage analysis is therefore performed more accurately than heretofore.

Turning now to the drawings, reference numeral 10 in FIG. 1 generally depicts a warehouse environment or venue in which products 12, shown in FIG. 1 as boxes or cartons for simplicity, are associated with inventory data to be captured by mobile data capture devices 22, as described below. The venue 10 may be any indoor or outdoor venue, and may have any layout or configuration. As shown in FIG. 2, a zone of the venue 10 may have, for example, a plurality of shelving structures 6 and 8 separated by an aisle 4, and the products 12 can be mounted on the shelving structures 6, 8. Each product 12 may be tagged with a radio frequency (RF) identification (RFID) tag, preferably a passive RFID tag for cost reasons, and/or with a near field communication (NFC) tag, and, in some applications, each RFID/NFC tag may be associated with a pallet, or a container, for supporting multiple products 12. Each product 12 may, additionally or alternately, advantageously be labeled with a bar code symbol, or with any other type of identifier.

Figure 2:
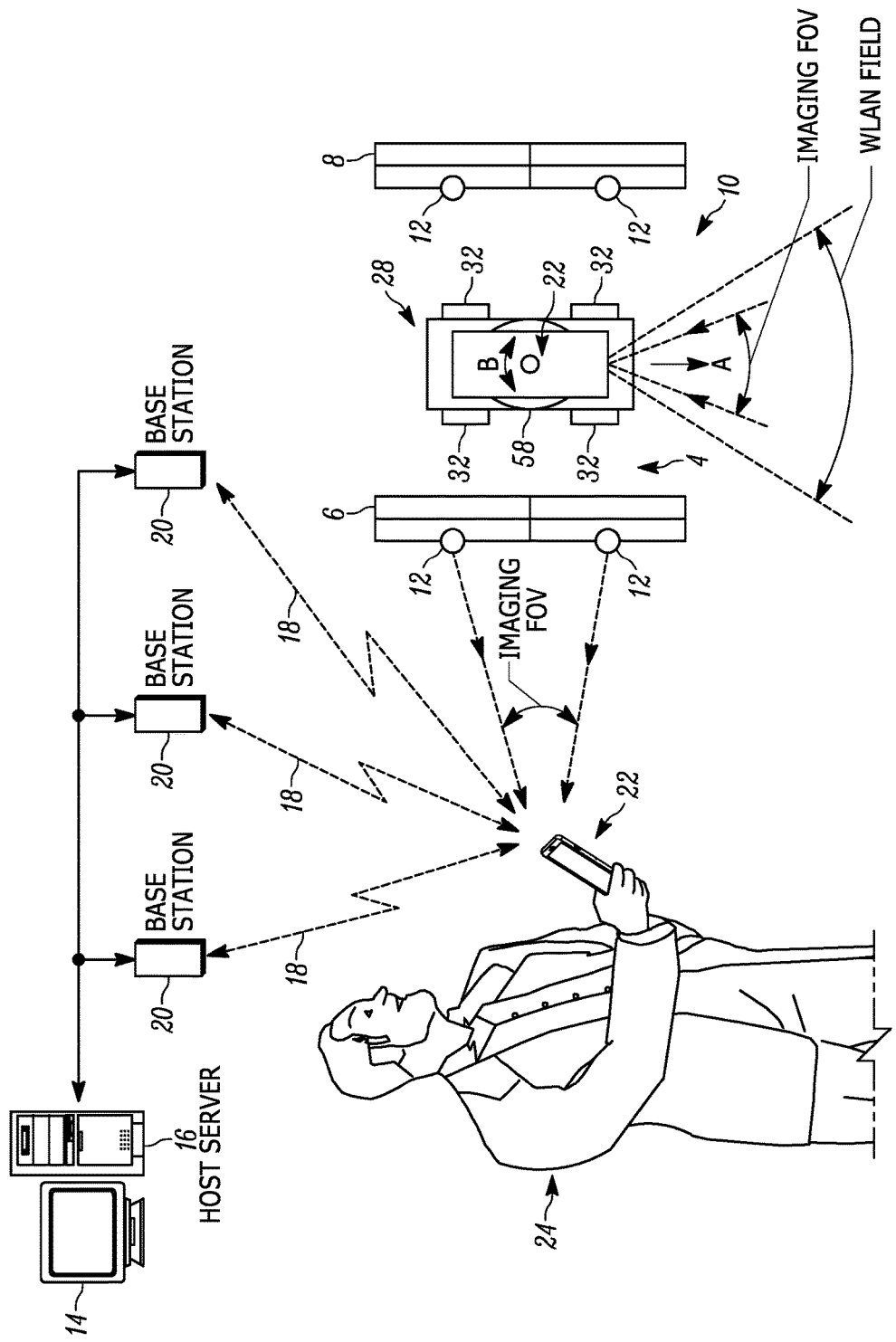
FIG. 2 is a diagrammatic view depicting a representative user, and a representative automated vehicle, each operative for moving mobile data capture devices in the venue of FIG. 1.
Figure 3:
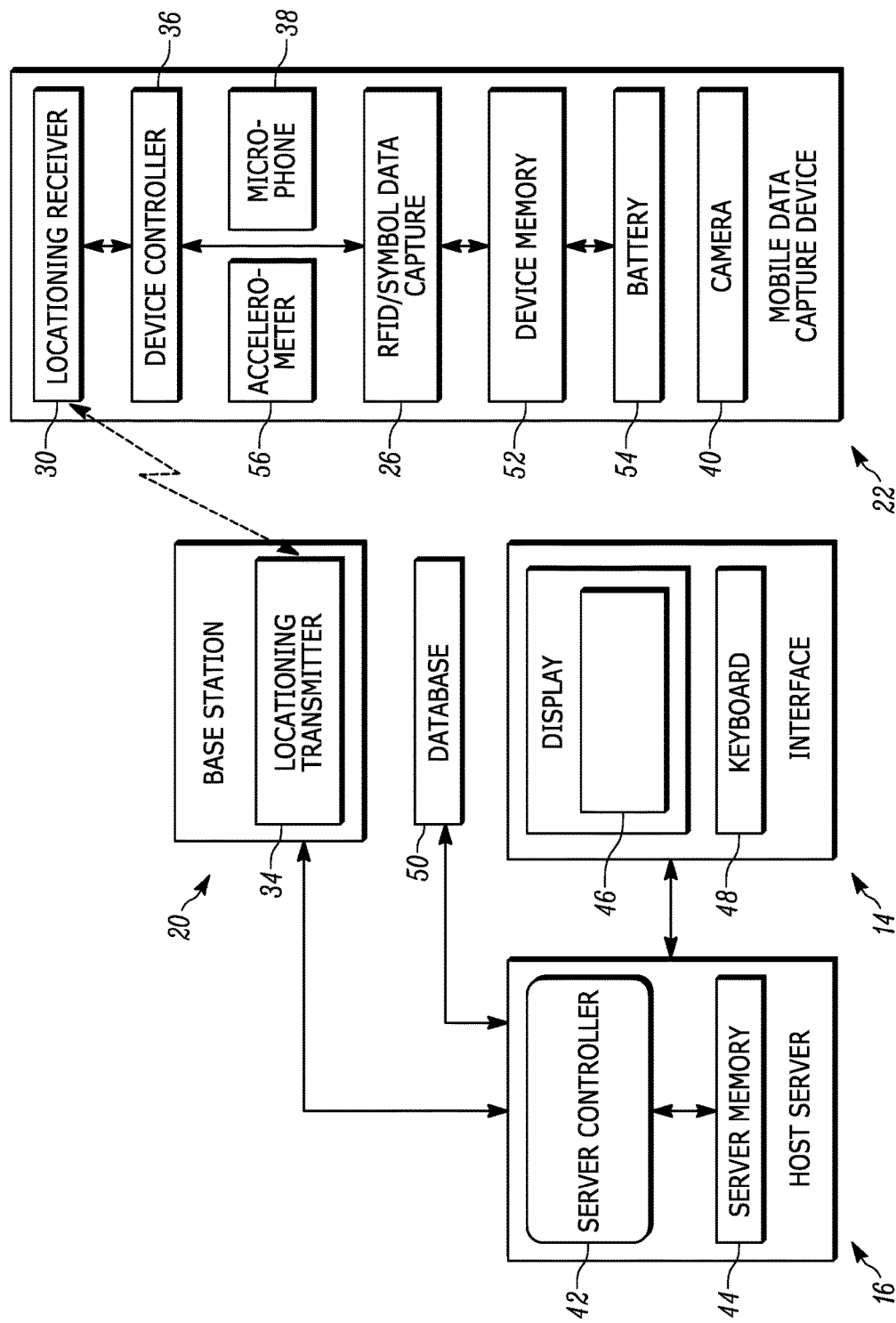
FIG. 3 is a block diagram of some of the components of the arrangement of FIG. 1.

As shown in FIG. 3, each mobile capture device 22 has a data capture module 26 operative, for example, as an RFID and/or NFC tag reader for reading the RFID and/or NFC tags that are associated with the products 12, or as a laser-based or an imager-based bar code symbol reader for reading the bar code symbols associated with the products 12. Such data capture identifies the products for such purposes as locationing, tracking, and inventory control. Each mobile capture device 22 may also be provided with a voice communication module. As shown in FIGS. 1-2, the mobile capture device 22 may be configured to be handheld and carried by a human operator 24 as the operator walks through the venue 10, or the mobile capture device 22 may be supported by an automated vehicle 28 during travel through the venue. As shown, the vehicle 28 is a land cart having wheels 32 and is self-propelled, for example, either autonomously, or by the operator, or by remote control, along the aisle 4 between the shelving structures 6, 8 past the products 12 in the direction of the arrow "A". The vehicle 28 may be any form of conveyance, either human-propelled or motor-propelled. and, for example, may even be an aerial vehicle or flying drone. In one embodiment, the vehicle 28 is a robotic vehicle configured for data collection and autonomous navigation throughout the venue 10.

As also shown in FIGS. 1-2, the mobile data capture devices 22 are wirelessly linked together in a wireless local area network (WLAN) having a plurality of base stations (e.g., access points) 20 deployed in the venue under the control of a network computer or host server 16. In an embodiment, the base stations 20 can, for example, be installed every twenty to eighty feet or so apart in a grid pattern. The base stations 20 propagate a WLAN field in the venue 10 by transmitting and receiving radio frequency (RF) signals to and from the mobile devices 22 to enable the operators 24 and/or the vehicles 28 to move freely within the venue 10 and still be connected to the WLAN, and, if desired, to the wider Internet. An advantageous embodiment of the WLAN may be based on the Institute of Electrical and Electronics Engineers (IEEE) 802.11 standards, marketed under the Wireless Fidelity (Wi-Fi) brand name The host server 16 is typically locally located in a backroom at the venue 10, and comprises one or more computers and is in communication with each base station 20. The server 16 may also be remotely hosted in a cloud server. The server 16 controls each base station 20. In one embodiment, the server 16 also controls an interface 14, as described below.

In accordance with this disclosure, the coverage of the WLAN field in which the RF signals are propagated in the venue 10 is to be mapped and analyzed as a result of the mobile device 22 moving through a plurality of locations in the venue 10. As shown in FIGS. 2-3, the mobile device 22 may be located by transmitting a plurality of RF signals from a corresponding plurality of transmitters 34 provided in a corresponding plurality of the base stations 20 along RF signal paths 18 to a receiver 30 provided in the mobile device 22. The positions of the base stations 20 are fixed and known. A device controller 36 in the mobile device 22 measures the strength of the received RF signals, and the distance between the mobile device 22 and each base station 20 is determined by triangulation, trilateration, or like locating techniques known in the art.

Many other types of locating techniques can be used for locating the mobile device 22 inside the venue 10. For example, an ultrasonic locationing system may be employed for locating the mobile device 22 by transmitting an ultrasonic signal to an ultrasonic receiver, e.g., a microphone 38, on the mobile device 22. More particularly, a plurality of ultrasonic transmitters, such as voice coil or piezoelectric speakers, mounted, for example, at known, fixed positions in the venue, can transmit ultrasonic energy to the microphone 38. The receipt of the ultrasonic energy at the microphone 38 locates the mobile device 22. Each ultrasonic speaker periodically transmits ultrasonic ranging signals, preferably in short bursts or ultrasonic pulses, which are received by the microphone 38 on the mobile device 22. The microphone 38 determines when the ultrasonic ranging signals are received. The flight time difference between the transmit time that each ranging signal is transmitted and the receive time that each ranging signal is received, together with the known speed of each ranging signal, as well as the known and fixed locations and positions of the speakers, are all used to determine the position of the microphone 38 and of the mobile device 22, using a suitable locationing technique, such as triangulation, trilateration, multilateration, among others.

The RF receiver 30 can also receive RF signals indicative of the WLAN field coverage. The device controller 36 samples the strengths of the received RF signals, and thereby measures coverage data indicative of the WLAN field coverage from the locations in the venue. In addition, a camera 40 is provided in the mobile device 22 and is operated by the device controller 36 to capture image data indicative of images of the locations in the venue 10 over an imaging field of view (FOV), as well as to capture the times that the image data were taken. The FOV is the solid angle over which the camera 40 is sensitive to light returning from the locations in the venue 10. The device controller 36 then correlates the measured coverage data and the captured time-stamped image data at each location in the venue 10. As described below in connection with FIGS. 4A and 4B, the interface 14 displays the captured time-stamped image data correlated with the measured coverage data at each location.

More particularly, as shown in FIG. 3, the server 16 includes a server controller 42 and a server memory 44. The interface 14 includes a display monitor screen 46 and a keyboard 48 or analogous manual entry device. The server controller 42 controls the interface 14 and a database 50. The mobile device 22 also includes a device memory 52, a battery 54 for powering the mobile device 22, and, preferably, an accelerometer 56 for determining the position and/or orientation of the mobile device 22. The measured coverage data and the captured time-stamped image data may be recorded and stored in the device memory 52 and/or in the server memory 44 and/or in the database 50. The measured coverage data and the captured time-stamped image data may be correlated by the device controller 36 and/or by the server controller 42. In an embodiment, the camera 40 includes a wide-angle lens in order to capture a wide field of view (FOV) within the WLAN field coverage field at each location of the mobile device 22. Alternatively or in addition, the camera 40 is a panoramic camera configured for capturing panoramic image data at a plurality of locations of the mobile device 22.

In one mode of operation, as the operator 24 walks through the venue 10, he/she may aim the field of view of the camera 40 in any direction, and for as long as desired, and the camera 40 captures time-stamped images of the locations or scenes in the venue, while the receiver 30 is substantially simultaneously measuring the WLAN field at these locations. In another mode of operation, the vehicle 28 advances through the venue, and the camera 40 of the supported mobile device 22 is operated to capture time-stamped images of the locations or scenes in the venue, while the receiver 30 of the supported mobile device 22 is substantially simultaneously measuring the WLAN field at these locations. The supported mobile device 22 is advantageously mounted on a stage or platform 58 (see FIG. 2), which can rotate the supported mobile device 22 in azimuth in either circumferential direction, as indicated by arrow "B", about a vertical axis, and/or tilt the supported mobile device 22 up or down in elevation to thereby aim the field of view in any desired direction and for as long as desired. The accelerometer 56 assists in determining the position and orientation of the supported mobile device 22. The vehicle 28 can advantageously be programmed to run on a predetermined automatic schedule, for example, at night, and along a predetermined route.

Figure 4A:
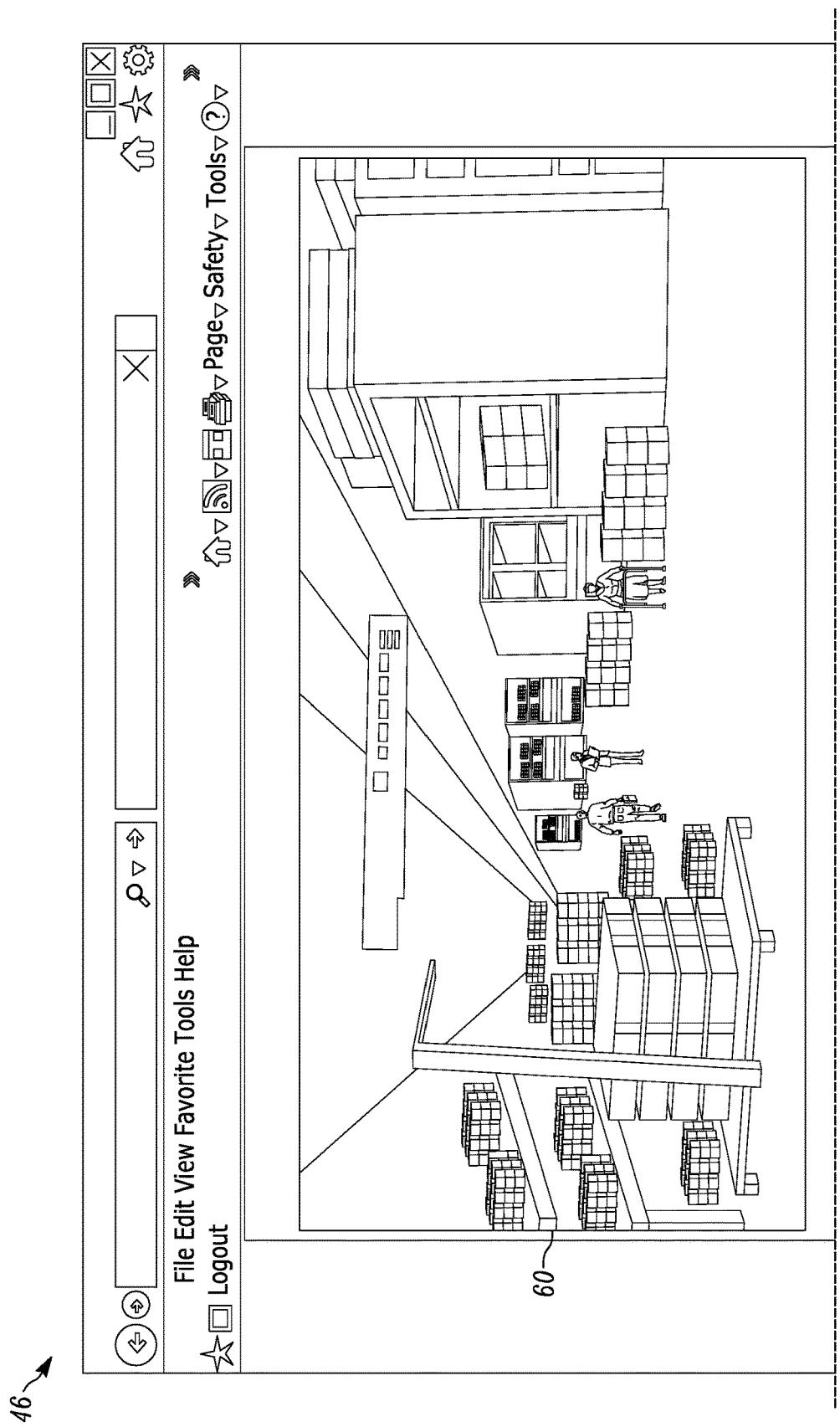
FIG. 4A and FIG. 4B together comprise a screen shot on a display screen of image data captured by each mobile data capture device, WLAN field coverage data measured by each mobile data capture device and correlated with the image data, as well as impact score value data correlated with the image data and the WLAN field coverage data.
Figure 4B:
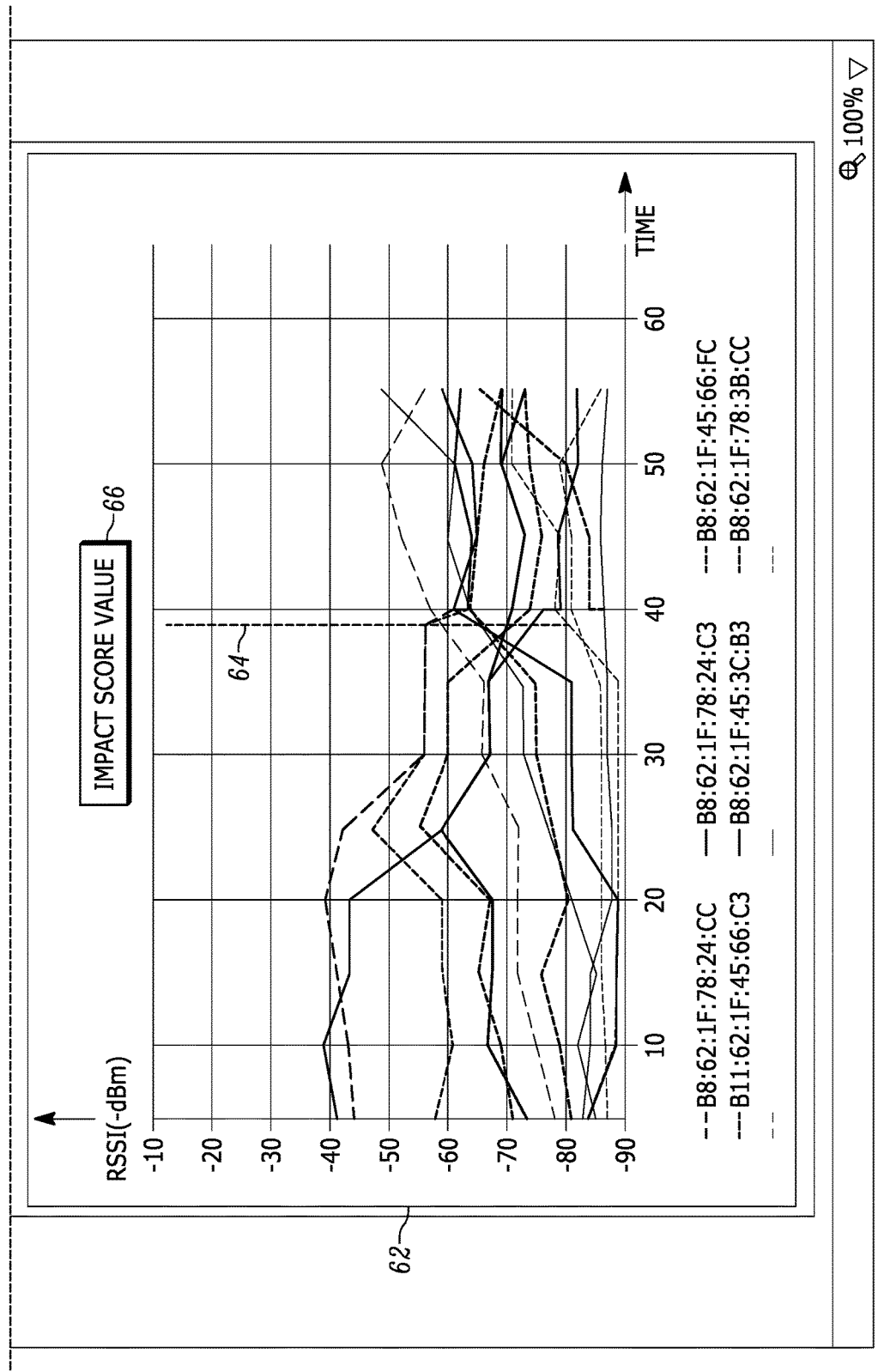

FIGS. 4A and 4B together comprise a representative screen shot that is displayed on the display 46 of the interface 14, and includes, among other things, the simultaneous display of the captured image data 60 and the measured coverage data 62. Alternatively or in addition, the screen shot of FIGS. 4A and 4B may be displayed directly on an onboard display of the mobile device 22. The measured coverage data 62 is a graphical representation of received signal strength intensity (RSSI), expressed in —dBm units, of RF signals propagated from the multiple base stations 20 along the Y-axis, and of time along the X-axis. In an embodiment, the graphs can be drawn in real time as the mobile device 22 is moved. The image data 60 and the coverage data 62 can be viewed in real time, or they can be recorded and stored, e.g., in the database 50, for subsequent viewing and analysis. The image data 60 is an actual depiction or picture, such as a photo or a video frame, of the physical scene at each location and corresponding time, e.g., at the time selected by a line or cursor 64. The layout of the image data 60 and the coverage data 62 can be in portrait or landscape orientation, with the positions of the image data 60 and the coverage data 62 being reversed and/or at least partly overlaid, and with the sizes of the image data 60 and the coverage data 62 being varied or fixed. For example, in one embodiment, the image data 60 corresponding to a time instance selected by the line or cursor 64 (FIG. 4B) may be shown in an embedded image data window at the top of the line or cursor 64, wherein the embedded image data window is updated as a user slides the line or cursor 64 along the graph representing the time-varying coverage data 62.

Impact score value data 66, which typically is a numerical value indicative of physical obstructions, such as those listed in the table of FIG. 5, and/or environmental conditions, such as those listed in the table of FIG. 6, in the venue 10, may also be simultaneously displayed and updated on the display 46, or on the onboard display of the mobile device 22, and correlated with the respective captured image data 60 and the respective measured coverage data 62. In order to determine the impact score value data 66, the device controller 36 is also operative, as described below, for recognizing such predetermined obstructions and/or environmental conditions from the captured image data. For example, a visual recognition algorithm, such as represented by the flow chart of FIG. 7, can be programmed on the device controller 36 to recognize such obstructions and/or environmental conditions, and to determine and display the impact score value data 66 for each such recognized obstruction and/or condition.

Thus, as shown in FIG. 5, a plurality of representative predetermined obstructions, patterns, or objects of various material types and states are indexed by numerals 1 . . . N and stored in a database accessible by the device controller 36 as a table of obstructions and pattern indexes (OPI). Each such obstruction/pattern is associated with an OPI coefficient (OPIC), which is a default numerical value that is approximately indicative of the extent to which it obstructs, e.g., attenuates, the WLAN field. Thus, a greater OPIC, such as 5 associated with an empty metal shelf (index 5) attenuates the WLAN field more than a dry wall (index 3) whose OPIC is 1. The default OPICs form part of a pre-established propagation model.

Each such obstruction/pattern listed in the table of FIG. 5 is also associated with a weighting factor relating to the distance OPIC-D between the respective obstruction/pattern and the mobile device. The distance can be determined by a rangefinder, or preferably from the captured image data in combination with data indicating a corresponding focal length of the focusing lens system of the camera 40. Each weighting factor is inversely proportional to the distance. Thus, the greater the distance, the lesser the WLAN field is attenuated by the respective obstruction/pattern. As illustrated, indexes 1-6 are reciprocals of the distance raised to the first power, whereas indexes 7-11 are reciprocals of the distance raised to higher powers, thereby signifying the different extents at which the attenuation changes with distance for indexes 1-6 as compared to indexes 7-11. As further shown in FIG. 5, indexes 7-11 are associated with possible RF emission, which may result in signal interference. In one embodiment, an indicator of a possible RF emission/interference source is provided for the user, for example, by visually tagging a respective object detected in the image data and displayed at the interface 14 and/or the mobile device 22.

Turning now to FIG. 6, a plurality of predetermined environmental conditions are indexed by numerals 1 . . . N and stored in a database accessible by the device controller 36 as a table of environmental conditions indexes (ECI). Each such environmental condition is associated with a determination (yes or no) whether or not a base station 20 is or is not detected, respectively, in the image data 60. Each environmental condition is also associated with an ECI penalize factor (ECI-PF), which is a default numerical multiplier value that is approximately indicative of the extent to which the respective environmental condition attenuates the WLAN field. Thus, a greater ECI-PF, such as 2 associated with an inside small room in which a base station has not been detected (index 3) attenuates the WLAN field more than an inside small room in which a base station has been detected (index 2) whose ECI-PF is 1. The default ECI-PFs also form part of the pre-established propagation model.

Figure 7:
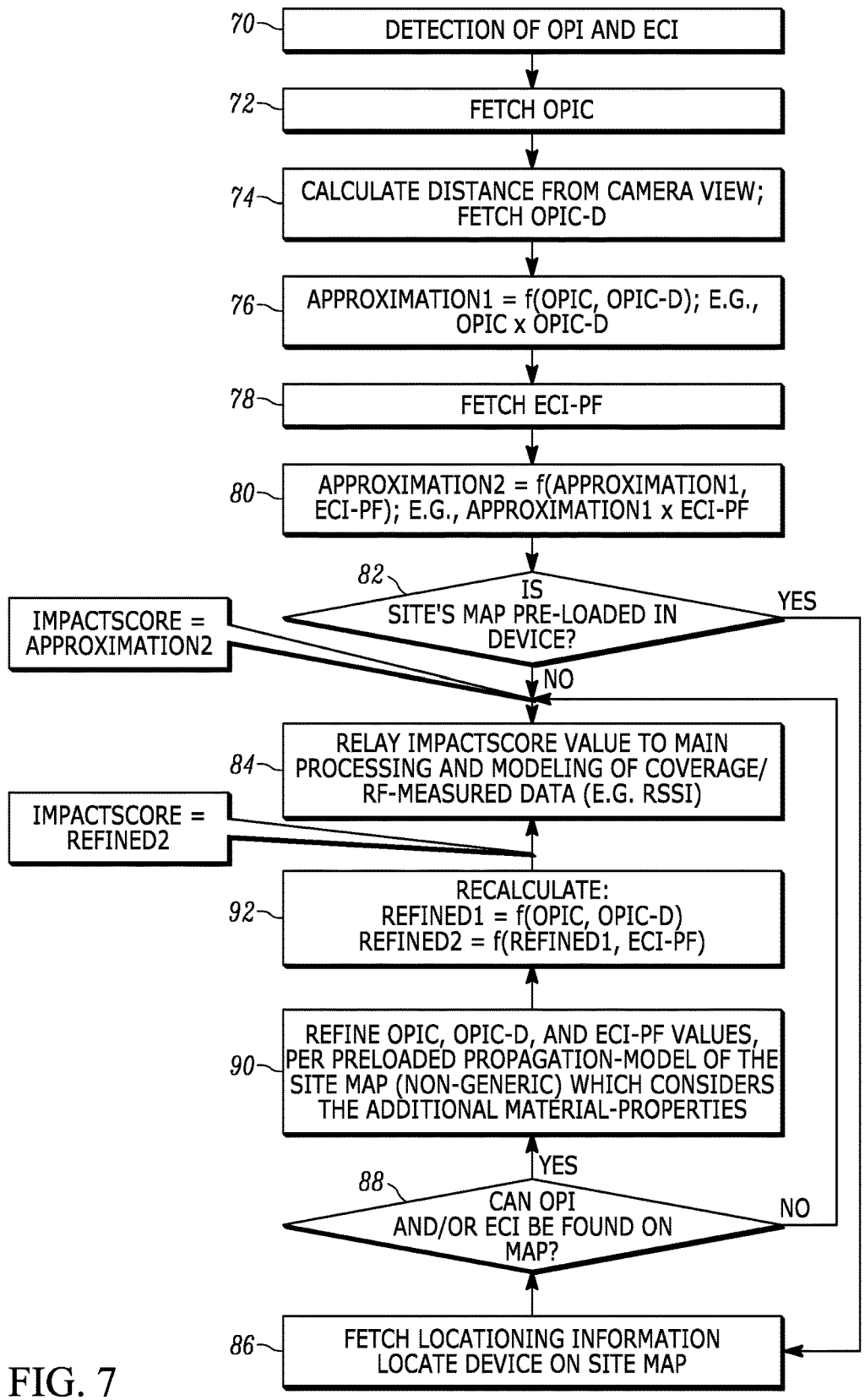
FIG. 7 is a flow chart of steps performed in determining the impact score value data for display on the display screen of FIGS. 4A and 4B.

The flow chart of FIG. 7 depicts the steps performed by the device controller 36 to recognize the obstructions of FIG. 5 and/or the environmental conditions of FIG. 6, and to determine and display the impact score value data 66 for each such recognized obstruction and/or condition at each location in the venue 10. First, the camera 40 detects the OPI and/or the ECI from the captured image data in step 70. Then, the device controller 36 fetches and retrieves the stored OPIC from the associated detected OPI from the database in step 72. In step 74, the device controller 36 calculates the distance between the associated detected OPI and the mobile device 22, and the device controller 36 fetches and retrieves the stored OPIC-D from the database. In step 76, the device controller 36 calculates a first approximation (Approximation1) of the impact score value data by multiplying OPIC by OPIC-D. Although the steps 70, 72, 74 and 76 have been individually illustrated in FIG. 7 for purposes of clarity, they can all be performed in a single step. The device controller 36 fetches and retrieves the stored ECI-PF from the database in step 78. In step 80, the device controller 36 calculates a second approximation (Approximation2) of the impact score value data 66 by multiplying Approximation by ECI-PF. Although the steps 78 and 80 have been individually illustrated in FIG. 7 for purposes of clarity, they can both be performed in a single step.

Next, in step 82, the device controller 36 determines whether a map of the venue 10 has been preloaded on the mobile device 22. If not, then the impact score value data 66 is considered to be Approximation2, and this impact score value data 66 is relayed to the device controller 36 for further processing and/or for display in step 84. If the map was preloaded, then the device controller 36 locates the mobile device 22 on the map in step 86, and then determines whether or not the OPI and/or the ECI can also be found on the map in step 88. If not, then the impact score value data 66 is again considered to be Approximation2, and this impact score value data 66 is relayed to the device controller 36 for further processing and/or for display in step 84. However, if the OPI and/or the ECI can be found on the map, then the device controller 36 refines and updates the OPIC, OPIC-D and the ECI-PF values based on additional information or metadata provided by the map in step 90, and calculates, in step 92, a first refined recalculation (Refined1) of the impact score value data 66 by multiplying the refined OPIC by the refined OPIC-D, and by calculating a second refined recalculation (Refined2) of the impact score value data 66 by multiplying Refined1 by the refined ECI-PF. The impact score value data 66 is now considered to be Refined2, and this impact score value data 66 is relayed to the device controller 36 for further processing and/or for display in step 84.

An analyst or user that is viewing the screen shot of FIGS. 4A and 4B may move the cursor 64 to any desired time along the X-axis to view the corresponding actual image of the mobile device location and, optionally, the impact score value data 66, at that time. For example, the analyst may see that a particular location has a low RSSI, or a high impact score value data 66, that is indicative of a cold zone of poor coverage, and may wish to see the actual environmental conditions at that location and time to try and determine why the coverage of that zone was poor. The analyst might see nothing unusual, or might see some physical obstruction or environmental condition for such poor coverage, and recommend corrective action. Non-limiting examples of corrective action may include re-measuring field coverage when the physical obstruction is removed, moving base station locations, adjusting the power output of the base stations to take into account the existence and attenuation characteristics of identified obstructions (e.g., metallic obstructions, non-metallic obstructions, temporary shelving), among others. In accordance with this disclosure, the analyst can resurrect the physical or environmental conditions in which the WLAN field coverage measurement was conducted and perform a more accurate WLAN analysis than heretofore.

In yet another embodiment, the characteristics of the RF propagation environment identified from the captured image data, including attenuation constants corresponding to obstructions, wall types, or other environmental condition variables affecting coverage in the venue 10, are provided to an RF propagation modeling computer for enhancing the accuracy of modeling various coverage scenarios within the venue (e.g., modeling predicted coverage effects based on changing position, antenna types, and/or power output of one or more of the base stations 20).

Figure 8:
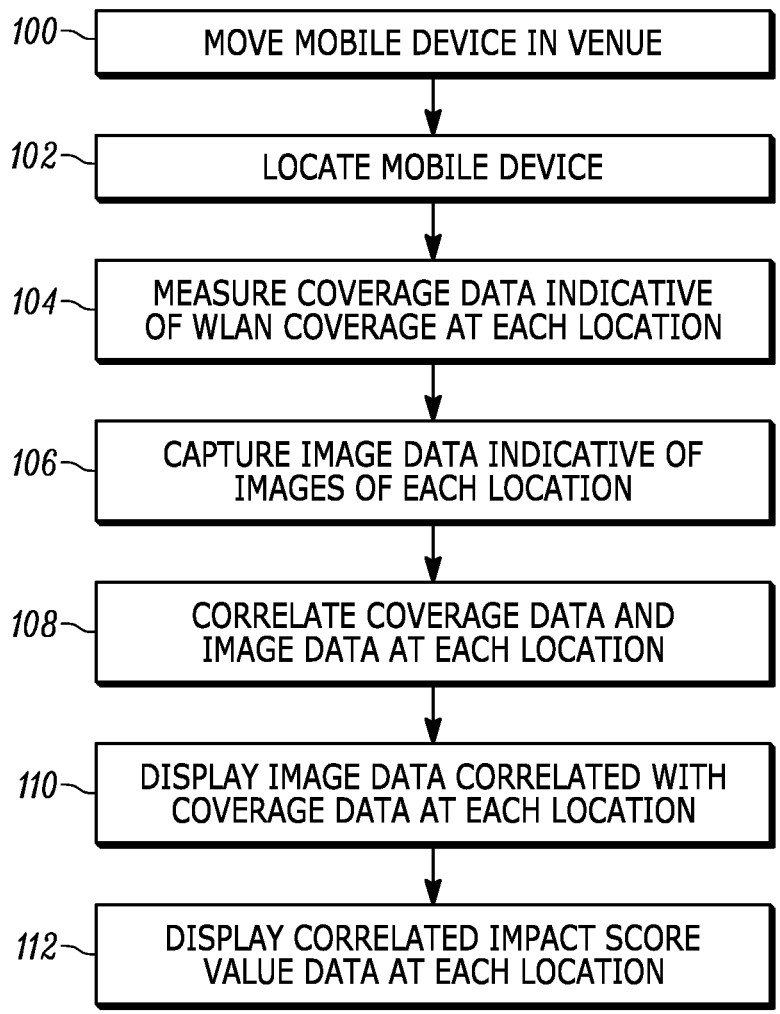
FIG. 8 is a flow chart of a method of analyzing the WLAN field coverage in accordance with the present disclosure.

The flow chart of FIG. 8 depicts the operation of the method of this disclosure. The method of analyzing WLAN field coverage is performed by moving a mobile data capture device 22 in the venue 10 in step 100, by locating the mobile device 22 in the venue 10 in step 102, by measuring coverage data indicative of the WLAN field coverage at each location in step 104, by capturing image data indicative of images of each location in step 106, by correlating the measured coverage data and the captured image data at each location in step 108, and by displaying the captured image data correlated with the measured coverage data at each location in step 110. The aforementioned impact score value data 66 may also be determined, correlated, and displayed for each location in step 112.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A reader or structure that is "configured" in a certain way is configured in at least that way, but may also be configured in ways that are not listed.

It will be appreciated that some embodiments may be comprised of one or more generic or specialized processors (or "processing readers") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage reader, a magnetic storage reader, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A system for analyzing wireless local area network (WLAN) field coverage in a venue, the system comprising:
  a mobile data capture device movable in the venue, and operative to:
    measure coverage data indicative of the WLAN field coverage from a plurality of locations in the venue, and
    capture image data indicative of images of the locations in the venue;
  a controller operatively connected to the mobile data capture device, the controller correlating the measured coverage data and the captured image data at each location; and
  an interface operatively connected to the controller, the interface displaying the captured image data correlated with the measured coverage data at each location,
  wherein the controller recognizes at least one of a predetermined object and a predetermined environmental condition from the captured image data, determines a coverage impact score value data based on the at least one of the predetermined object and the predetermined condition, correlates the determined coverage impact score value data with the captured image data and with the measured coverage data, causes the interface to display the correlated coverage impact score value data with the captured image data and with the measured coverage data at each location, and when the controller recognizes the predetermined object to be associated with a radio frequency (RF) emission associated with RF interference, the controller provides an indicator of the RF interference in connection with the predetermined object in the captured image data.

2. The system of claim 1, wherein the mobile data capture device receives a plurality of radio frequency (RF) signals from RF transmitters at fixed, known positions in the venue, and wherein the controller locates the mobile data capture device at each location by measuring strengths of the plurality of the received RF signals.

3. The system of claim 1, further comprising a database accessible by the controller, and wherein the controller records and stores the correlated coverage data and the image data at each location in the database.

4. The system of claim 1, wherein the interface has a display screen, and wherein the controller controls the display screen to simultaneously display the captured image data and the measured coverage data at each location selected by a user.

5. The system of claim 1, wherein the controller controls a display screen to simultaneously display the captured image data and the measured coverage data in real time as the mobile data capture device moves through the venue.

6. The system of claim 1, wherein the controller locates the at least one recognized object and condition on a map, updates default values assigned to the at least one recognized object and condition to refined values, and determines the coverage impact score value data based on the refined values.

7. A method of analyzing wireless local area network (WLAN) field coverage in a venue, the method comprising:
  measuring, by a mobile data capture device, coverage data indicative of the WLAN field coverage from a plurality of locations in the venue;
  capturing, by the mobile data capture device, image data indicative of images of the locations in the venue;
  recognizing, by a controller operatively connected to the mobile data capture device, at least one of a predetermined object and a predetermined environmental condition from the captured image data;
  determining, by the controller, a coverage impact score value data based on the at least one of the predetermined object and the predetermined condition;
  correlating, by the controller, the determined coverage impact score value data with the captured image data and with the measured coverage data; and
  displaying, by the controller, the correlated coverage impact score value data with the captured image data and with the measured coverage data at each location,
  wherein,
  when the controller recognizes the predetermined object to be associated with a radio frequency (RF) emission associated with RF interference, the controller provides an indicator of the RF interference in connection with the predetermined object in the captured image data.

8. The method of claim 7, further comprising receiving a plurality of radio frequency (RF) signals from RF transmitters at fixed, known positions in the venue, and locating the mobile data capture device at each location by measuring strengths of the plurality of the received RF signals.

9. The method of claim 7, further comprising recording and storing the correlated coverage data and the image data at each location in a database.

10. The method of claim 7, further comprising simultaneously displaying the captured image data and the measured coverage data at each location.

11. The method of claim 10, wherein the simultaneous displaying of the captured image data and the measured coverage data is performed in real time as the mobile data capture device moves through the venue.

12. The method of claim 7, further comprising locating the at least one recognized object and condition on a map, updating default values assigned to the at least one recognized object and condition to refined values, and determining the coverage impact score value data based on the refined values.

\* \* \* \* \*